US012657086B2

(12) United States Patent
Chen

(10) Patent No.: US 12,657,086 B2
(45) Date of Patent: Jun. 16, 2026

(54) VALLEY SEARCH IN READ ERROR RECOVERY FOR A MEMORY DEVICE USING LOW-DENSITY PARITY CHECK SYNDROME WEIGHT AND AUTO-READ CALIBRATION

(71) Applicant: Micron Technology, Inc., Boise, ID (US)

(72) Inventor: Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 18/771,829

(22) Filed: Jul. 12, 2024

(65) Prior Publication Data

US 2025/0110826 A1     Apr. 3, 2025

Related U.S. Application Data

(60) Provisional application No. 63/587,697, filed on Oct. 3, 2023.

(51) Int. Cl.
G06F 11/10        (2006.01)

(52) U.S. Cl.
CPC ...... *G06F 11/1016* (2013.01); *G06F 11/1048* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 9,563,502 B1* | 2/2017 | Alhussien | ........... G11C 11/5642 |
| 12,038,805 B1* | 7/2024 | Zhang | ................... G06F 11/076 |
| 2009/0319843 A1 | 12/2009 | Meir et al. | |
| 2016/0247576 A1 | 8/2016 | Park | |
| 2017/0236592 A1 | 8/2017 | Alhussien et al. | |
| 2018/0046527 A1 | 2/2018 | Reusswig et al. | |
| 2019/0348124 A1 | 11/2019 | Kim | |
| 2020/0202952 A1* | 6/2020 | Lee | ..................... G11C 16/3495 |
| 2022/0171566 A1* | 6/2022 | Kim | ..................... G11C 16/349 |
| 2022/0336036 A1* | 10/2022 | Lee | ................... G11C 29/12005 |

OTHER PUBLICATIONS

M. Zhang, F. Wu, Q. Yu, W. Liu, Y. Wang and C. Xie, "Exploiting Error Characteristic to Optimize Read Voltage for 3-D NAND Flash Memory," in IEEE Transactions on Electron Devices, vol. 67, No. 12, pp. 5490-5496, Dec. 2020, (Year: 2020).*
International Search Report and Written Opinion for International Application No. PCT/US2024/049500, mailed Jan. 6, 2025, 9 Pages.

* cited by examiner

*Primary Examiner* — Daniel F. McMahon

(74) *Attorney, Agent, or Firm* — Lowenstein Sandler LLP

(57)        ABSTRACT

A processing device in a memory sub-system identifies a plurality of read retry offset voltages having respective check-fail bit counts that are within a target check-fail bit count range for a programming level of a memory device, performs one or more auto-read calibration operations for each of the plurality of read retry offset voltages, and determines respective syndrome weights for sense words read from the memory device using each of the plurality of read retry offset voltages. The processing device further identifies a read retry offset voltage of the plurality of read retry offset voltages having a lowest respective syndrome weight, and performs an error recovery operation using the identified read retry offset voltage.

20 Claims, 8 Drawing Sheets

100

HOST SYSTEM 120

MEMORY SUB-SYSTEM 110

MEMORY SUB-SYSTEM CONTROLLER 115

PROCESSOR 117

LOCAL MEMORY 119

ERROR HANDLING COMPONENT 113

MEMORY DEVICE 130

Local Media Controller 135

Memory Array 104

MEMORY DEVICE 140

Figure 2:
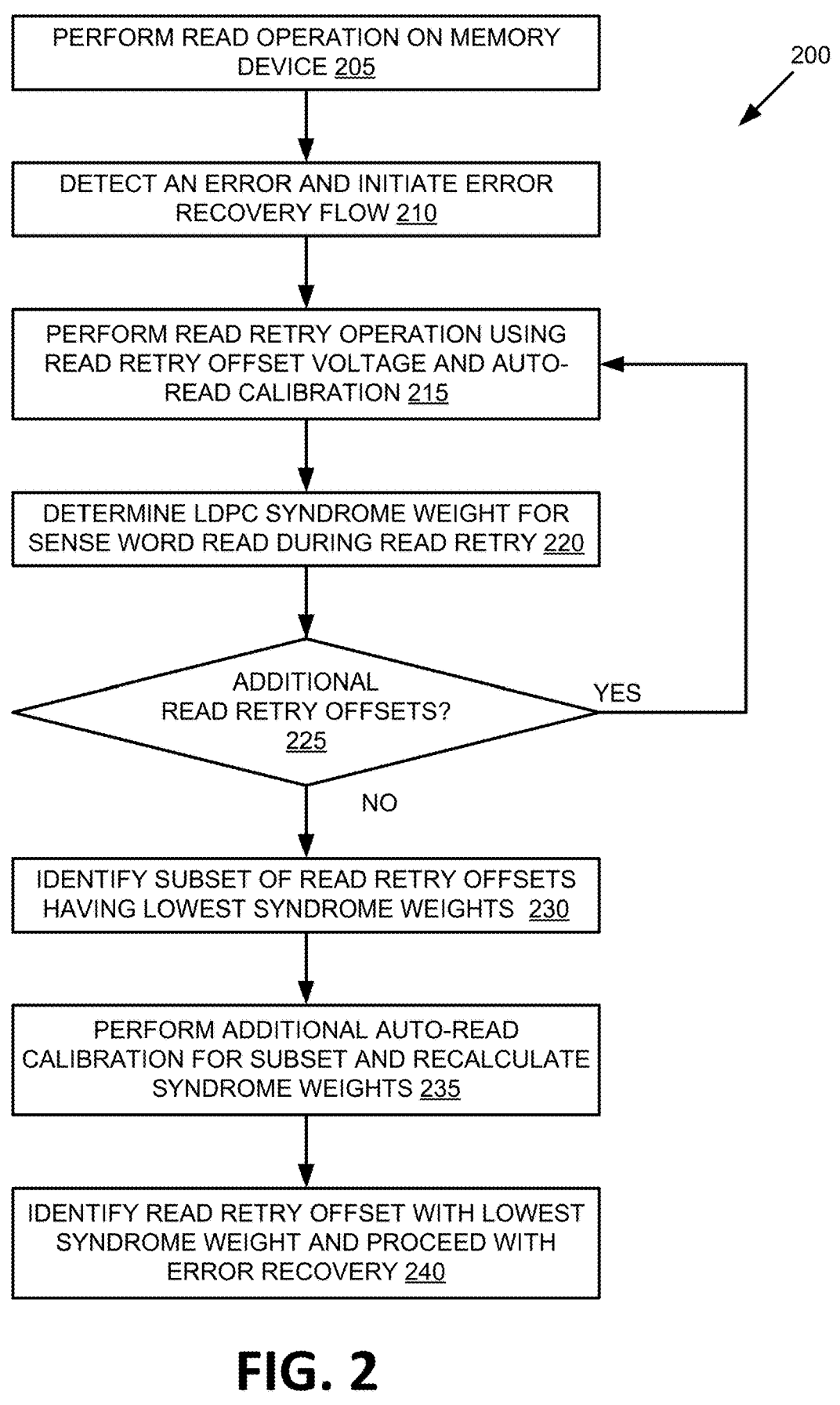

PERFORM READ OPERATION ON MEMORY DEVICE 205

↓

DETECT AN ERROR AND INITIATE ERROR RECOVERY FLOW 210

↓

PERFORM READ RETRY OPERATION USING READ RETRY OFFSET VOLTAGE AND AUTO-READ CALIBRATION 215

↓

DETERMINE LDPC SYNDROME WEIGHT FOR SENSE WORD READ DURING READ RETRY 220

↓

ADDITIONAL READ RETRY OFFSETS? 225 — YES →

NO

↓

IDENTIFY SUBSET OF READ RETRY OFFSETS HAVING LOWEST SYNDROME WEIGHTS 230

↓

PERFORM ADDITIONAL AUTO-READ CALIBRATION FOR SUBSET AND RECALCULATE SYNDROME WEIGHTS 235

↓

IDENTIFY READ RETRY OFFSET WITH LOWEST SYNDROME WEIGHT AND PROCEED WITH ERROR RECOVERY 240

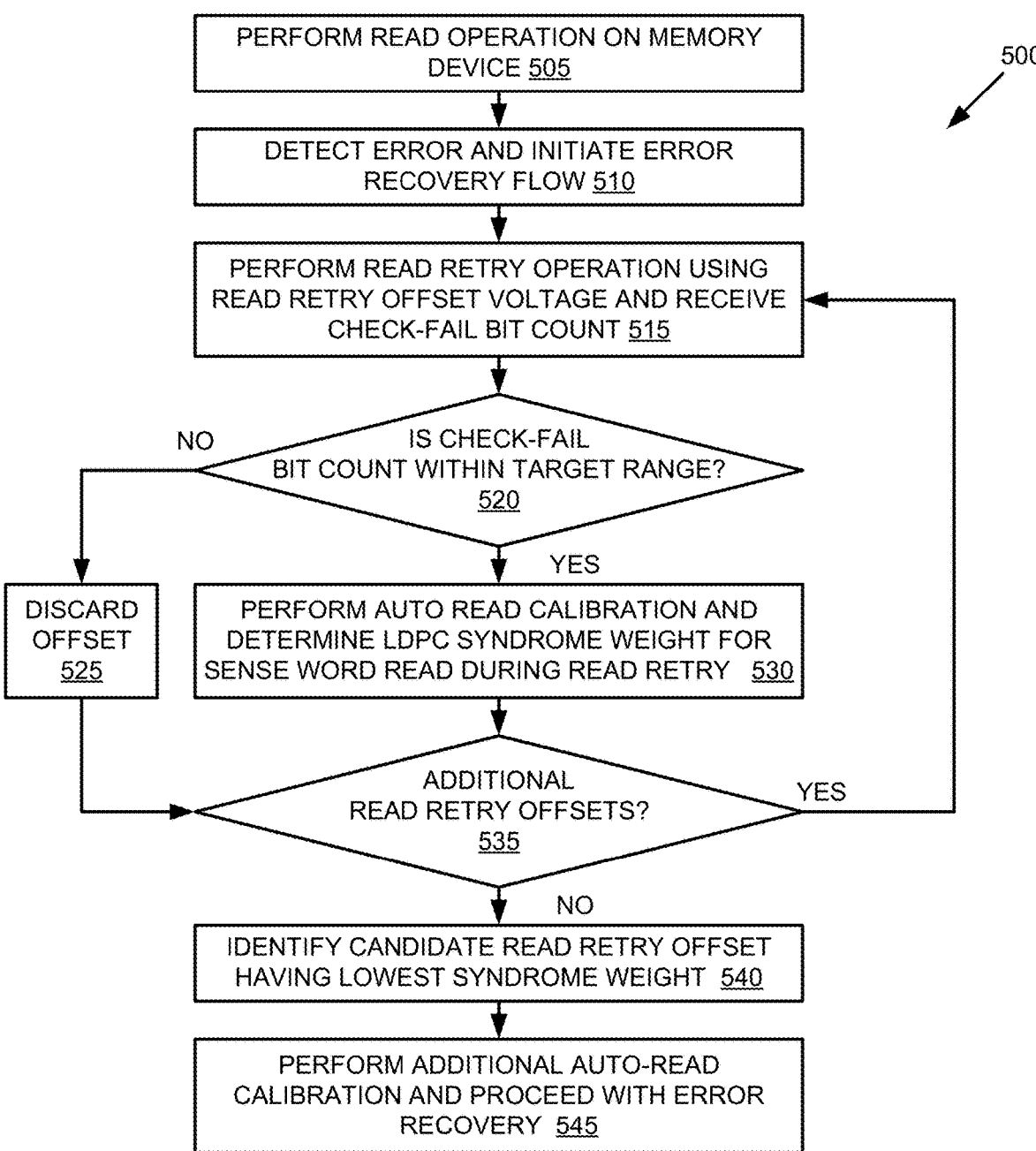

PERFORM READ OPERATION ON MEMORY DEVICE 505

DETECT ERROR AND INITIATE ERROR RECOVERY FLOW 510

PERFORM READ RETRY OPERATION USING READ RETRY OFFSET VOLTAGE AND RECEIVE CHECK-FAIL BIT COUNT 515

IS CHECK-FAIL BIT COUNT WITHIN TARGET RANGE? 520

NO

YES

DISCARD OFFSET 525

PERFORM AUTO READ CALIBRATION AND DETERMINE LDPC SYNDROME WEIGHT FOR SENSE WORD READ DURING READ RETRY 530

ADDITIONAL READ RETRY OFFSETS? 535

YES

NO

IDENTIFY CANDIDATE READ RETRY OFFSET HAVING LOWEST SYNDROME WEIGHT 540

PERFORM ADDITIONAL AUTO-READ CALIBRATION AND PROCEED WITH ERROR RECOVERY 545

VALLEY SEARCH IN READ ERROR RECOVERY FOR A MEMORY DEVICE USING LOW-DENSITY PARITY CHECK SYNDROME WEIGHT AND AUTO-READ CALIBRATION

RELATED APPLICATIONS

This application claims the benefit of priority from U.S. Provisional Application No. 63/587,697, filed Oct. 3, 2023, the entire contents of which are hereby incorporated by reference herein.

TECHNICAL FIELD

Embodiments of the disclosure relate generally to memory sub-systems, and more specifically, relate to valley search in read error recovery for a memory device using low density parity check (LDPC) syndrome weight and auto-read calibration in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a flow diagram of an example method of a read retry error recovery process for a memory device using low density parity check (LDPC) syndrome weight and auto-read calibration in accordance with some embodiments of the present disclosure.

FIG. 5 is a flow diagram of an example method of a failed-bit count based error recovery process for a memory device using LDPC syndrome weight and auto-read calibration in accordance with some embodiments of the present disclosure.

DETAILED DESCRIPTION

Figure 1A:
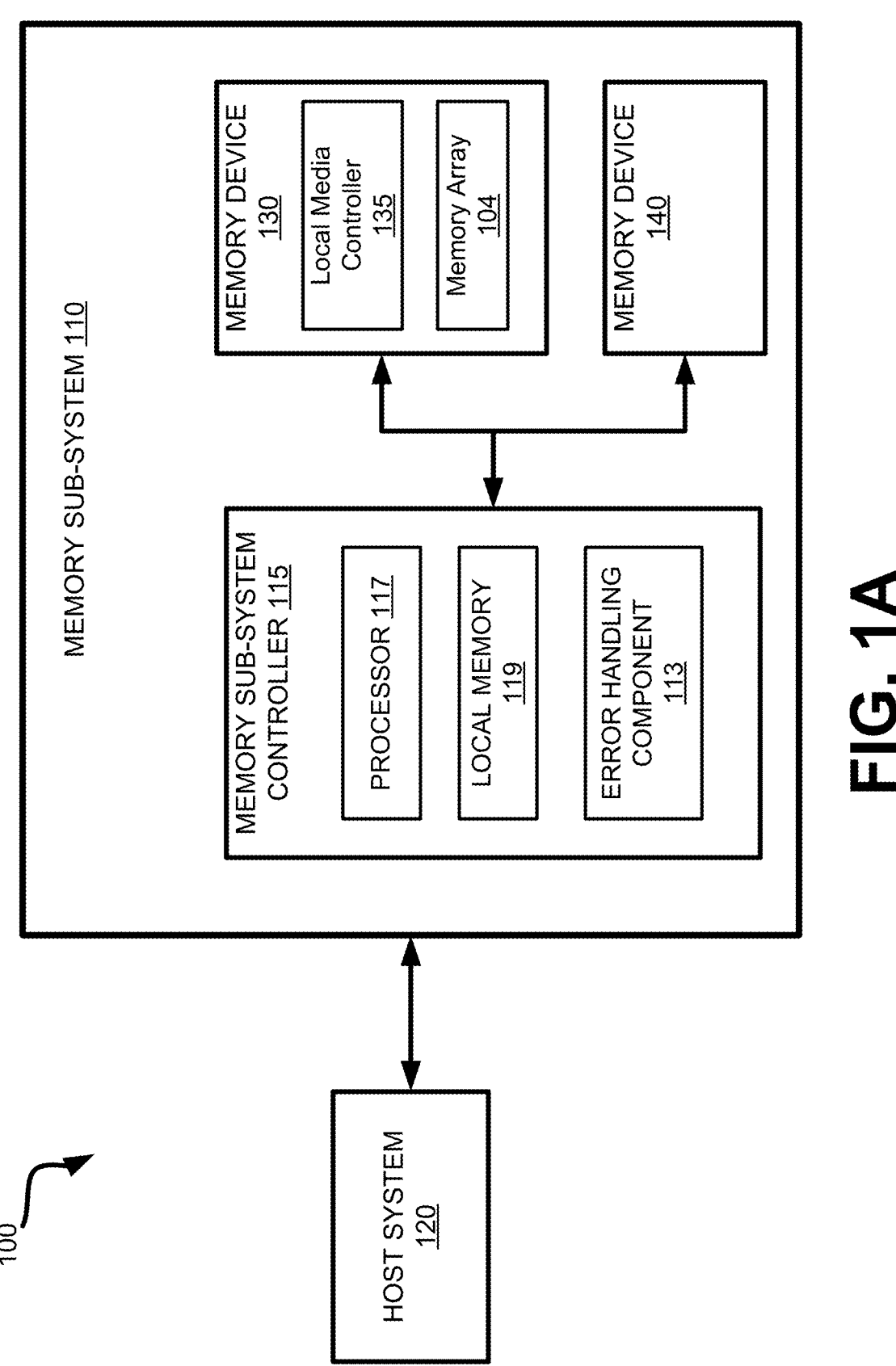
FIG. 1A illustrates an example computing system that includes a memory sub-system in accordance with some embodiments of the present disclosure.

Aspects of the present disclosure are directed to valley search in read error recovery for a memory device using low density parity check (LDPC) syndrome weight and auto-read calibration in a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. In performing error correcting code operations, including, as part of a read operation, encoded data stored on the memory device can be transmitted from the memory device to the memory sub-system controller. The memory sub-system controller can perform decoding operations to decode the encoded data into the original sequence of bits that were encoded for storage on the memory device. A number of bits of the decoded data received by the memory sub-system controller may have been flipped due to noise, interference, distortion, bit synchronization errors, or errors from the media itself (both intrinsic and extrinsic). For example, a bit that may have originally been stored as a 0 may be flipped to a 1 or vice versa.

For certain memory types (i.e., for memory sub-systems employing certain types of storage media), error rates can vary over time. In particular, some non-volatile memories have threshold voltage programming distributions (i.e., groups of memory cells that are programmed to the same threshold voltage level) that move or "drift" over time due to various stress conditions, such as data retention, read disturb, temperature variation, etc. At a given read voltage level (i.e., a value of the voltage applied to a memory cell as part of a read operation), if the threshold voltage programming distributions move, then certain reliability statistics can also be affected. One example of a reliability statistic is a bit error rate (BER). The BER can be defined as the ratio of the number of erroneous bits to the number of all data bits stored in a unit of the memory sub-system, where the unit can be the entire memory sub-system, a die of memory device, a collection of codewords, or any other meaningful portion of the memory sub-system.

A read operation can be performed with a read voltage level. The read voltage level or value can be a particular voltage that is applied to memory cells of a memory device to read the data stored at the memory cells. For example, if a threshold voltage of a particular memory cell is identified as being below the read voltage level that is applied to the particular memory cell, then the data stored at the particular memory cell can be a particular value (e.g., '1') and if the threshold voltage of the particular memory cell is identified as being above the read voltage level, then the data stored at the particular memory cell can be another value (e.g., '0'). Thus, the read voltage level can be applied to memory cells to determine values stored at the memory cells. In general, the read voltage level can be initially set to be a voltage that lies in the "valley" between two programming distributions. While the two programming distributions include respective ranges of voltages to which memory cells are programmed, this valley between them represents a range of voltages to which memory cells are not intentionally programmed to allow for separate of the programming levels corresponding to each distribution.

In certain memory sub-systems, when the threshold voltage programming distributions of a memory cell change, the application of the read voltage level can be inaccurate relative to the changed threshold voltage. For example, a memory cell can be programmed to have a threshold voltage below the read voltage level. The programmed threshold voltage can change over time and can shift to be above the read voltage level (i.e., the threshold voltage of the memory cell can shift from initially being below the read voltage level to being above the read voltage level). As a result, when the read voltage level is applied to the memory cell, The read voltage level no longer falls in the valley between programming distributions, but instead may fall within a programming distribution. Accordingly, the data stored at the memory cell can be misread or misinterpreted to be at a wrong value as compared to the value as originally stored when the threshold voltage had not yet shifted.

The speed or rate of the drift of the threshold voltage programming distributions and corresponding BER of a conventional memory sub-system can be affected by one or more operating characteristics of the memory sub-system, such as cycling conditions, changes in die temperature, or read disturb conditions. Such threshold voltage drift and degradation can cause errors during the performance of a memory access operation (e.g., a read operation, a write operation, etc.) in the memory sub-system. For example, while performing a read operation, a memory sub-system controller can misread bits representing data stored at the memory device (i.e., the stored value is read incorrectly). In another example, one or more bits representing data stored at the memory device can contain errors (i.e., the value is stored incorrectly). Either situation can result in an error during performance of a read operation (e.g., a memory access operation error). Upon detecting that a memory access operation error has occurred, the memory sub-system controller can perform an error correction operation to correct the errors in the data and perform the memory access operation again to access the corrected data.

To address errors due to threshold voltage drift, certain memory sub-systems employ a predefined error recovery process including a sequence of read retry operations at different read retry voltage levels (e.g., sensing voltage levels) to enable error correction and data recovery. The error recovery process can include the execution of a sequence of multiple read retry operations to re-read data as part of an error correction process. For example, the error recovery process can include the use of multiple different read retry threshold voltages including a base value (e.g., read retry threshold voltage 1 ($V_{r1}$)), a second value offset from the base value (e.g., read retry threshold voltage 2 ($V_{r2}$)), a third value offset from the base value (e.g., read retry threshold voltage 3 ($V_{r3}$)), etc. The read retry threshold voltages are intended to cover the voltage drift range over different periods of time. For example, read retry operation 1 (i.e., execution of a read retry operation at $V_{r1}$ is employed during a first time period of the error recovery process (e.g., a time range of 1 microsecond to a few seconds), read retry operation 2 (i.e., execution of the read retry operation at $V_{r2}$ is employed during a second time period (e.g., a time range of a few seconds to a few hours), read retry operation 3 (i.e., execution of a read retry operation at $V_{r3}$) is employed during a third time period exceeding a few hours to cover longer voltage drifts, etc.

As the read retry voltages span a range of voltages surrounding the initial read voltage, when the programming distributions shift, it can be possible for one or more of the read retry voltages to be placed in the wrong valley (i.e., at a voltage level that is greater than the peak voltage of the programming distribution attempting to be read or less than the peak voltage of a lower programming distribution). Once a read retry voltage crosses over into the wrong valley, existing local read level calibration algorithms, such as auto-read calibration (ARC) will fail. In an auto-read calibration operation, the memory sub-system sweeps the threshold voltage level across a range around a baseline threshold voltage in an attempt to locate the valley bottom (i.e., the center of the space between two adjacent programming distributions) where the read level can be placed. If the read retry voltage level is in the wrong valley, the auto-read calibration operation will find the bottom of the wrong valley. If the read level is placed in the wrong valley, the BER will be increased significantly and can exceed the levels that system error correcting code is designed to correct.

Even after finding the valley bottom (i.e., the correct valley bottom), additional deep retry steps may be used to correct errors. Deep retry steps refer to relatively long latency error recovery techniques such as soft retry (with soft bit reads), corrective reads, etc. Often these techniques are combined, causing even longer latency (e.g., a soft retry is combined with one hard bit read and two soft bit reads (called 1H2S) combined with 2-bit corrective read (CR) takes). For these heroic error recovery steps, it is required that hard bit read level is located in the correct valley and at the valley bottom. Otherwise, the long latency deep retry recovery is wasted, because the raw read BER can be so high such that the gain from these deep retry techniques is not sufficient to compensate the sub-optimal read level to pass error decoding. The memory sub-system cannot tell in advance whether the deep retry techniques are needed for error recovery, so the ideal error recovery flow is able to find the correct valley and valley bottom and then apply those deep retry steps. Since it is not known whether deep retry is needed, it cannot be omitted. With the multiple read retry voltages that can be used, at least some of which can be located in the wrong valley, there thus exists the possibility that the long latency deep retry recovery is performed for a read retry voltage that will not improve performance in any way. Thus, when a brute force valley search method is implemented (i.e., where each possible read retry voltage is used followed by respective auto-read calibration operations and deep retry steps), the memory sub-system will incur a very long latency that hurts read performance and quality of service.

In implementations, the memory sub-system utilizes another error handling approach based on a check-fail bit count. For example, the memory device may, in response to a read operation, return the check-fail bit count (CFBit). The check-fail bit count reflects (i.e., is equal to or is derived by a known transformation from) the number of non-conducting bitlines in the sensed data. In one embodiment, the memory device can inspect at least a part of a memory page (e.g., four or eight bitlines) when counting non-conducting bitlines. A non-conductive bitline identifies a subset of memory cells having their respective threshold voltages above the applied read voltage level. Accordingly, the ratio of the number of cells that have their respective threshold voltages above the applied read voltage level to the total number of cells may be indicative of the position of the applied read voltage level to the bottom of the voltage distribution valley. Assuming that the data stored on the memory device is perfectly randomized, $1/n$ of the memory cells would be found within each logical programming level, where n is the number of logical programming levels supported by the memory cells (e.g., eight logical programming levels are supported by TLC cells). Accordingly, if the applied read voltage level is perfectly calibrated for the highest valley (e.g., the valley dividing L6 and L7 of TLC voltage distributions), then $1/n$ of the cells would be expected to have their respective threshold voltages above the applied read voltage level and thus $1/n$ of the bitlines would be expected to be non-conducting. This value can be used as a target check-fail bit count, and can be surrounded by a target check-fail bit count range extending above and below the target check-fail bit count value. An acceptable read voltage level should fall within this target check-fail bit count range, which would normally span the valley between programming distributions. If the programming distributions are unbalanced, however, such that one programming distribution includes significantly more memory cells than another, the target check-fail bit count range could span into the wrong valley. Once auto-read calibration is performed, it is possible that multiple read voltage levels can be moved outside the target check-fail bit count range, although one of those read voltage levels will be in the correct valley and one in the wrong valley. Since both are outside the target check-fail bit count range, the memory sub-system cannot distinguish which read voltage level is correct.

Aspects of the present disclosure address the above and other deficiencies by implementing valley search in read error recovery for a memory device using low density parity check (LDPC) syndrome weight and auto-read calibration in a memory sub-system. In one embodiment, the memory sub-system uses the LDPC syndrome weight as a proxy for the BER associated with each read retry voltage level so that the correct valley and valley bottom can be identified without having to perform the long latency deep retry steps for each possible read retry voltage. The memory sub-system controller can encode data into a format for storage at the memory device(s). For example, a class of error detection and correcting codes (ECC), such as low density parity check (LDPC) codes, can be used to encode the data. LDPC codes are capacity-approaching codes, which means that practical constructions exist which allow the error threshold to be set very close to a theoretical maximum. This error threshold defines an upper bound for errors in the data, up to which the probability of lost information can be made as small as desired. LDPC codes are reliable and highly efficient, making them useful in bandwidth-constrained applications. For example, encoded data written to physical memory cells of a memory device can be referred to as a codeword. The data read from the cells, which might include errors and differ from the codeword, can be referred to as a sense word. The sense word can include one or more of user data, error correcting code, metadata, or other information. The LDPC decoder can begin decoding by calculating a syndrome weight of a received sense word. The syndrome is the product of a parity check matrix with the decoded word (under the used finite field, typically binary), and the weight is the number of non-zero symbols in the syndrome. Thus, because the parity check matrix formed using LDPC codes is relatively sparse, the syndrome weight is positively correlated with the number of errors in the sensed codeword. If some other form of ECC is used, however, the parity check matrix may be quite different (i.e., less sparse) and the correlation between syndrome weight and bit error count can be different. In one embodiment, the memory sub-system can determine the syndrome weight for each of the possible read retry voltage levels, identify some number of the read retry voltage levels having the lowest syndrome weights, and only perform additional error recovery operations (e.g., ARC and deep retry operations) for those read retry voltage levels.

In another embodiment, when an error handling approach based on a check-fail bit count is utilized, the memory sub-system can similarly combine LDPC syndrome weight and auto-read calibration techniques to improve the error handling. For example, when multiple read retry offset voltages are identified as having an associated check-fail bit count that falls within a target check-fail bit count range, the memory sub-system can identify which read retry offset voltage is in the correct programming distribution valley. In a memory device that is not well balanced (i.e., where the number of memory cells in each programming distribution is approximately equal), the target check-fail bit count range can span two or more programming distribution valleys (i.e., one correct valley and one incorrect valley). Auto-read calibration operations can be performed to determine the valley bottom, but the memory sub-system cannot identify which read retry offset voltage is in the correct valley bottom. Accordingly, the memory sub-system can determine the respective LDPC syndrome weights for the candidate read retry offset voltages and compare them to identify the lowest syndrome weight. Although the actual error rates are not determined, given that there is likely to be a relatively large difference in the error rates between the read retry offset voltages positioned in different programming distribution valleys, the lowest syndrome weight is highly likely to be indicative of the read retry offset voltages with the lowest error rate. Accordingly, the read retry offset voltage with the lowest syndrome weight can be selected and any additional deep error recovery operations that may be necessary can be performed using that read retry offset voltage.

Advantages of the approach described herein include, but are not limited to, improved performance in the memory sub-system. The approaches for identifying the correct programming distribution valley based on read retry voltage levels and/or check-fail bit count, when assisted by LDPC syndrome weight and auto-read calibration, reduces latency and increases the efficiency of the error handling process. These techniques combine several metrics, which independently may not be adequate for accurate valley identification, and allow for reliable valley search by amplifying the difference between read offset levels in the wrong valley and the correct valley and using the syndrome weight as a representation of the respective error rates.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes an error handling component 113 that can perform a valley search in read error recovery for memory device 130 using LDPC syndrome weight and auto-read calibration to improve performance. In one embodiment, c detects an error during a memory access operation (e.g., a read operation) being performed on memory device 130 and initiates the error handling flow in response. The error handling flow can include a sequence of multiple error handling operations performed to correct the detected error. One step in the error handling flow can be a read retry operation, where the read operation is reattempted multiple times using different read retry voltages (i.e., where each read retry voltage is defined by a corresponding offset from the default read voltage level). In one embodiment, error handling component 113 can determine a respective syndrome weight for each of the possible read retry voltage levels, identify some number of the read retry voltage levels having the lowest syndrome weights, and only perform additional error recovery operations (e.g., ARC and deep retry operations) for those read retry voltage levels. In another embodiment, when an error handling approach based on a check-fail bit count is utilized, error handling component 113 can identify candidate read retry offset voltages that have an associated check-fail bit count that falls within a target check-fail bit count range and perform auto-read calibration operations for those voltages. Error handling component 113 can further determine the respective LDPC syndrome weights for the candidate read retry offset voltages and compare them to identify the lowest syndrome weight and proceed with any additional deep error recovery operations using the read retry offset voltage having the lowest syndrome weight after auto-read calibration is performed. Further details with regards to the operations of error handling component 113 are described below.

Figure 1B:
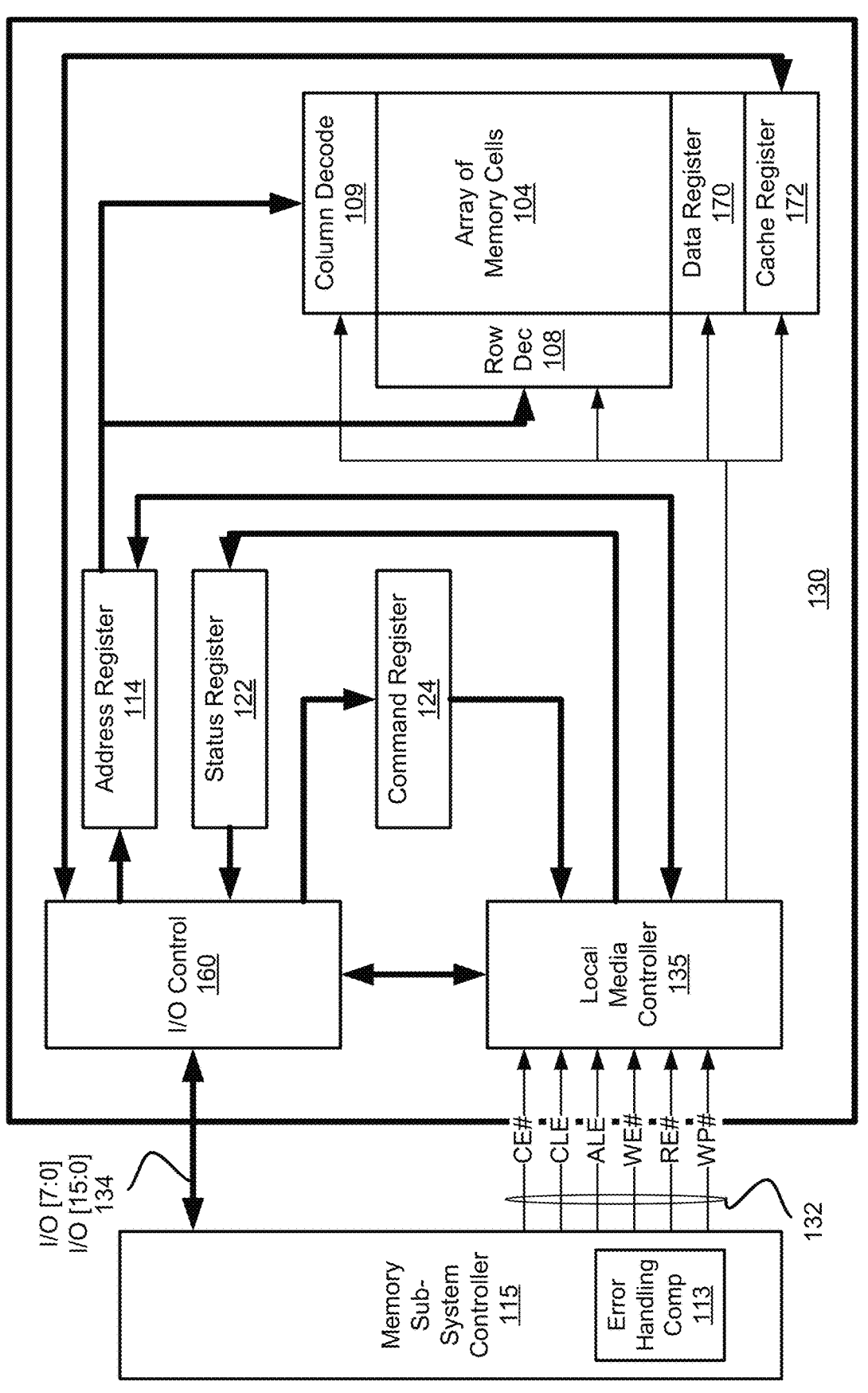
FIG. 1B is a block diagram of memory device(s) in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In one embodiment, memory sub-system controller 115 includes error handling component 113 configured to perform a valley search in read error recovery for a memory device using LDPC syndrome weight and auto-read calibration.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

FIG. 2 is a flow diagram of an example method of a read retry error recovery process for a memory device using low density parity check (LDPC) syndrome weight and auto-read calibration in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by error handling component 113 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic (e.g., error handling component 113) performs a read operation on a memory device, such as memory device 130. In one embodiment, the memory sub-system controller 115 receives, from a requestor, a request to read data from a memory device, such as memory device 130. In one embodiment, memory sub-system controller 115 receives the request from host system 120 or from some other component connected to or within memory sub-system 110. The request may identify data to be read from memory device 130 of memory sub-system 110. In response, the memory sub-system controller 115 reads a sense word from the memory device 130, the sense word including a sequence of bits representing the requested data. In one embodiment, the memory sub-system controller 115 identifies a physical address in memory device 130 where the requested data is stored, reads the sense word from memory device 130, and temporarily stores the sense word in a buffer or other storage location while parity check and/or error correction processes can be performed.

At operation 210, the processing logic detects an error and initiates an error recovery flow. In one embodiment, memory sub-system controller 115 uses error correct code (ECC) to check the sense word read from memory device 130 for errors. In response to detecting an error(s), the processing logic can attempt to correct the error(s), or if the error(s) exceeds the ECC capability of the system, can initiate an error recovery flow. In one embodiment, the error recovery flow includes a sequence of error recovery operations, which may be performed in a designated order, until the error is either corrected or deemed uncorrectable.

Figure 3:
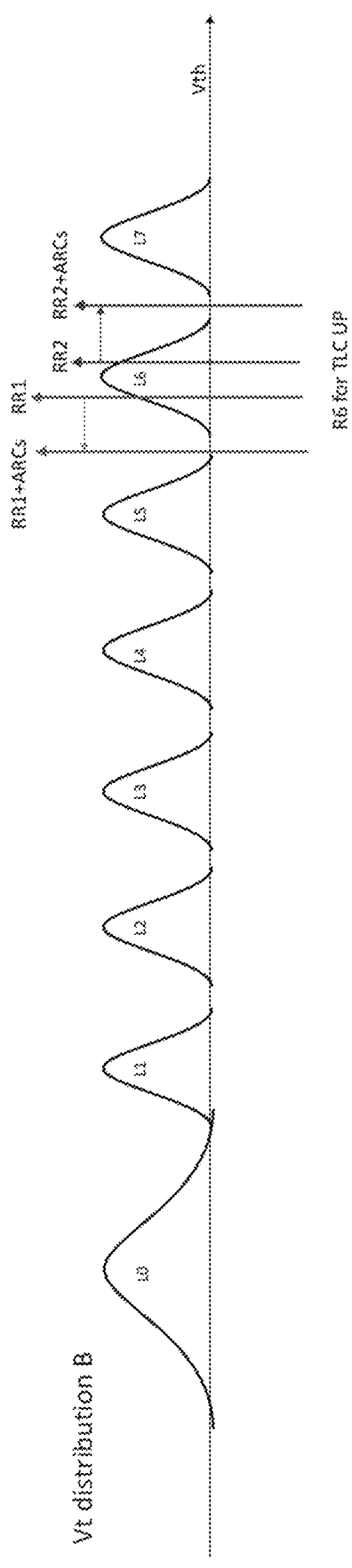
FIG. 3 is a diagram illustrating a series of programming voltage distributions for a memory device and associated read retry voltages in accordance with some embodiments of the present disclosure.

At operation 215, the processing logic performs a read retry operation using a read retry offset voltage and auto-read calibration. One example of an error recovery operation in the error recovery flow is a read retry operation. For example, error handling component 113 can perform a sequence of read retry operations at different read retry offset voltage levels (e.g., sensing voltage levels) to enable error correction and data recovery. Depending on the implementation, the sequence of read retry operations can be either preset or dynamically generated. In an embodiment, the sequence of read retry operations includes the use of multiple different read retry offset voltages, each varying from a base value (i.e., the read voltage level used to perform the initial read operation) by a respective offset amount. The different read retry offset voltages are intended to cover the voltage drift range over different periods of time. Thus, error handling component 113 can cause each of the read retry offset voltages to be applied to the wordlines of memory device 130 to read respective sense words, and can determine whether any of the read retry offset voltages result in fewer errors than the initial read voltage level. In addition, after performing each read retry operation, error handling component 113 can perform a corresponding auto-read calibration operation. During the auto-read calibration operation, error handling component 113 sweeps the threshold voltage level across a range around a baseline threshold voltage or threshold voltage set. Sweeping the threshold voltage level across the range includes selecting a subset of threshold voltages in the range and reading the physical address of memory device 130 using the subset of threshold voltages. A set of threshold voltage levels will be identified after the sweeping and then used to read the physical addresses to get the data. The auto-read calibration operation attempts to decrease the number of errors observed during a read operation by moving the read voltage level towards the bottom of the valley between programming distributions. An example is illustrated in FIG. 3. The set of voltage distributions 300 represents the number of cells in TLC memory associated with each different programming level L0-L7. When attempting to read memory cells in L6, for example, the different read retry offset voltages can include RR1 and RR2 (among others). In order to correctly read memory cells in L6, the read voltage should be placed in the valley between the L5 and L6 distributions (i.e., where RR1 is placed) and auto-read calibration will decrease the read voltage to the valley bottom. If a read retry offset voltage (e.g., RR2) is placed in the wrong valley, however, auto-read calibration will increase that read voltage to the wrong valley bottom (i.e., the valley between the L6 and L7 distributions). As the processing logic has no way of knowing which read retry offset voltage is in the correct valley, the LDPC syndrome weight can be used to identify the correct one, as described below. In addition, the sequence of read retry operations using different read retry offset voltages RR1-RRn, plus respective auto-read calibration (ARC) operations, is shown in operation 410 of flow 400 of FIG. 4.

At operation 220, the processing logic determines an LDPC syndrome weight for a sense word read during the read retry operation. In one embodiment, error handling component 113 executes a number of parity check equations on corresponding subsets of the sense word read using the read retry offset voltage at operation 215. In one embodiment, each of the parity check equations corresponds to a different subset of the bits of the sense word, although different subsets can share one or more bits. For example, in one embodiment, a subset can include 40 bits out of the 36 k bits in the sense word. There could be, for example, several thousand (e.g., 3 k) parity check equations each configured to operate on a different subset of 40 bits. Each parity check equation generates a parity check equation result which indicates whether a number of bits set to a value of '1' in the corresponding subset of the sense word is even or odd. In one embodiment, if the number of bits set to a value of '1' in the corresponding subset is even, the parity check equation result is said to be in a satisfied state and if the number of bits set to a value of '1' in the corresponding subset is odd, the parity check equation result is said to be in an unsatisfied state. In another embodiment, these values (i.e., logic states) can be reversed. Since any one bit of the sense word can be part of multiple different subsets, that bit can contribute to or be associated with multiple parity check equation results. In one embodiment, each bit of the sense word is part of the same number of subsets used by the parity check equations (e.g., 4 subsets). In addition, error handling component 113 can determine a syndrome for the sense word using the determined parity check equation results. In one embodiment, error handling component 113 logically combines the parity check equation results to determine the syndrome, such as by appending or concatenating the parity check equation results. Error handling component 113 further determines and stores a syndrome weight for the sense word The syndrome weight is a number of the parity check equations that are unsatisfied, which can be represented in the syndrome by the number of non-zero symbols (e.g., the number of bits set to a logical value of '1'). Although not a direct representation, the syndrome weight is indicative of the number of errors in the sense word read using a given read retry offset voltage. Thus, the relative syndrome weights associated with different read retry offset voltages can indicate which voltage is likely to result in fewer errors.

At operation 225, the processing logic determines whether there are additional read retry offset voltages to try. As indicated above, the memory sub-system controller 115 can implement a sequence of read retry operations at different read retry offset voltage levels. The processing logic can iterate through this sequence, performing operations 215 and 220 for each read retry offset voltage level in the sequence. Depending on the implementation, the sequence of read retry operations can be either preset or dynamically generated.

If there are no additional read retry offset voltages to try, at operation 230, the processing logic identifies a subset of the read retry offset voltages having the lowest LDPC syndrome weights. In one embodiment, error handling component 113 component compares the syndrome weights associated with each of the read retry offset voltages and identifies some number of the lowest syndrome weights. In one embodiment, error handling component 113 identifies the two read retry offset voltages having lower syndrome weights than the remaining read retry offset voltages. This can include, for example, the minimum syndrome weights 422 and 424 of FIG. 4. In other embodiments, the identified subset can include some other number of read retry offset voltages.

At operation 235, the processing logic performs additional auto-read calibration operations for the subset of the read retry offset voltages and recalculates the LDPC syndrome weights. As described above, the auto-read calibration operations can include sweeping the threshold voltage level across a range around a baseline threshold voltage or threshold voltage set and the syndrome weight is the number of unsatisfied parity check equations for the read sense word. Since the auto-read calibration operation can modify the read retry offset voltage, the sense word, and associated syndrome, may be different than was read and determined in operations 215 and 220. The additional auto-read calibration operations are shown in operation 430 of FIG. 4.

Figure 4:
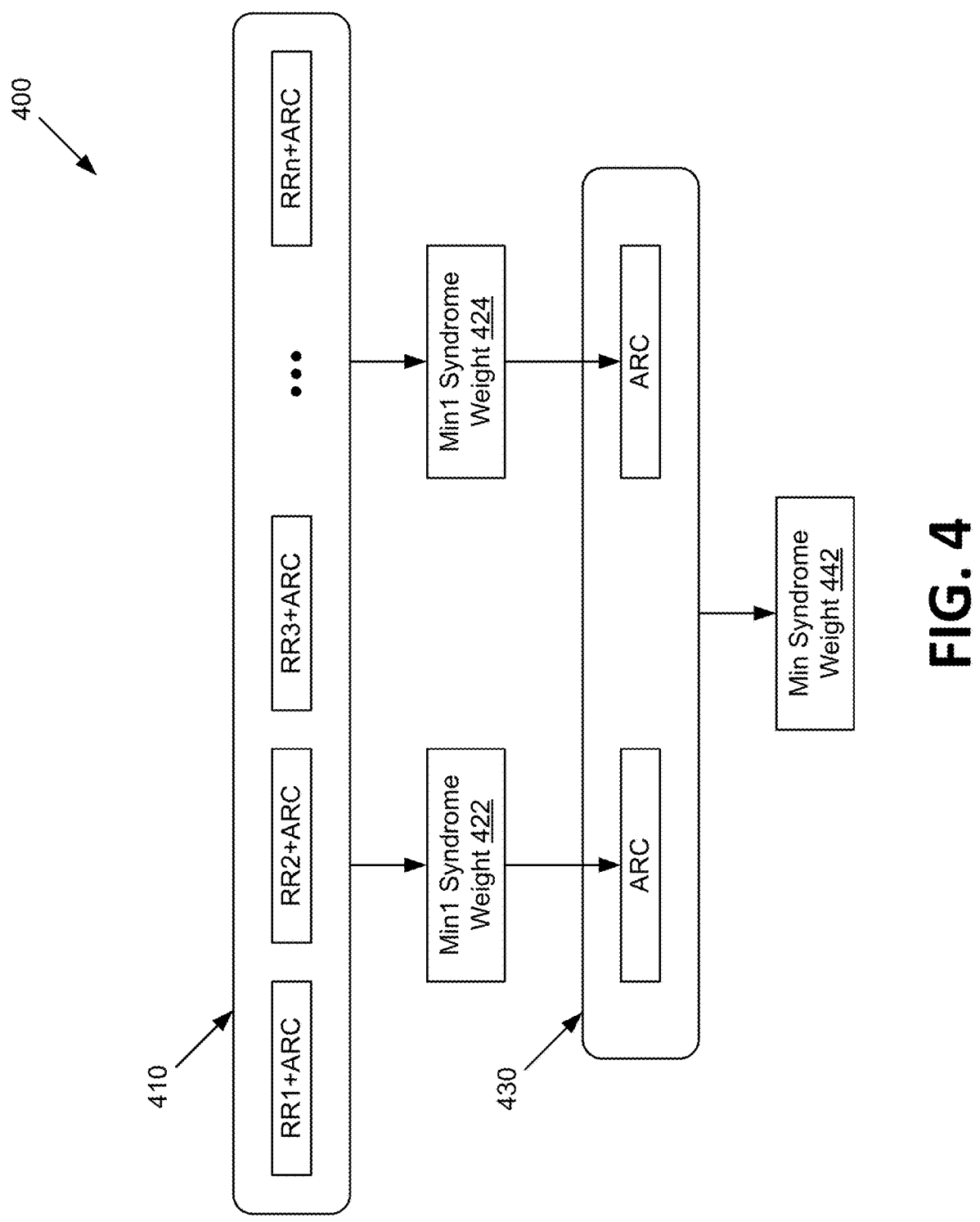
FIG. 4 is a block diagram illustrating a read retry error recovery process for a memory device using LDPC syndrome weight and auto-read calibration in accordance with some embodiments of the present disclosure.

At operation 240, the processing logic identifies the read retry offset voltage with the lowest syndrome weight and proceeds with the error recovery process. In one embodiment, error handling component 113 component compares the syndrome weights recalculated at operation 235 and identifies the lowest syndrome weight. Error handling component 113 can select the read retry voltage offset associated with the lowest syndrome weight as the preferred read level and can continue with error recovery (e.g., by performing deep error recovery operations). Such deep error recovery operations can include, for example, soft retry (i.e., soft read+soft decoding), corrective read, redundant array of independent NAND (RAIN) recovery, etc. The minimum syndrome weight 442 is illustrated in FIG. 4.

FIG. 5 is a flow diagram of an example method of a failed-bit count based error recovery process for a memory device using LDPC syndrome weight and auto-read calibration in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by error handling component 113 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic (e.g., error handling component 113) performs a read operation on a memory device, such as memory device 130. In one embodiment, the memory sub-system controller 115 receives, from a requestor, a request to read data from a memory device, such as memory device 130. In one embodiment, memory sub-system controller 115 receives the request from host system 120 or from some other component connected to or within memory sub-system 110. The request may identify data to be read from memory device 130 of memory sub-system 110. In response, the memory sub-system controller 115 reads a sense word from the memory device 130, the sense word including a sequence of bits representing the requested data. In one embodiment, the memory sub-system controller 115 identifies a physical address in memory device 130 where the requested data is stored, reads the sense word from memory device 130, and temporarily stores the sense word in a buffer or other storage location while parity check and/or error correction processes can be performed.

At operation 510, the processing logic detects an error and initiates an error recovery flow. In one embodiment, memory sub-system controller 115 uses error correct code (ECC) to check the sense word read from memory device 130 for errors. In response to detecting an error(s), the processing logic can attempt to correct the error(s), or if the error(s) exceeds the ECC capability of the system, can initiate an error recovery flow. In one embodiment, the error recovery flow includes a sequence of error recovery operations, which may be performed in a designated order, until the error is either corrected or deemed uncorrectable.

At operation 515, the processing logic performs a read retry operation using a read retry offset voltage and receives a corresponding check-fail bit count. One example of an error recovery operation in the error recovery flow is a read retry operation. For example, error handling component 113 can perform a sequence of read retry operations at different read retry offset voltage levels (e.g., sensing voltage levels) to enable error correction and data recovery. Depending on the implementation, the sequence of read retry operations can be either preset or dynamically generated. In an embodiment, the sequence of read retry operations includes the use of multiple different read retry offset voltages, each varying from a base value (i.e., the read voltage level used to perform the initial read operation) by a respective offset amount. The different read retry offset voltages are intended to cover the voltage drift range over different periods of time. Thus, error handling component 113 can cause each of the read retry offset voltages to be applied to the wordlines of memory device 130 to read respective sense words, and can determine whether any of the read retry offset voltages result in fewer errors than the initial read voltage level.

In one embodiment, the memory device 130 may, upon performing a read strobe, return the check-fail bit count (CFBit). The check-fail bit count reflects (i.e., is equal to or is derived by a known transformation from) the number of non-conducting bitlines in the sensed data. In various illustrative examples, the memory device 130 can inspect at least a part of a memory page (e.g., four or eight bitlines) when counting non-conducting bitlines. A non-conductive bitline identifies a subset of memory cells having their respective threshold voltages above the applied read voltage level. Accordingly, the ratio of the number of cells that have their respective threshold voltages above the applied read voltage level to the total number of cells may be indicative of the position of the applied read voltage level to the bottom of the voltage distribution valley. Assuming that the data stored on the memory device is perfectly randomized, $1/n$ of the memory cells would be find within each logical programming level, where n is the number of logical programming levels supported by the memory cells (e.g., eight logical programming levels are supported by TLC cells). Accordingly, if the applied read voltage level is perfectly calibrated for the highest valley (e.g., the valley dividing L6 and L7 of TLC voltage distributions), then 1/n of the cells would be expected to have their respective threshold voltages above the applied read voltage level and thus 1/n of the bitlines would be expected to be non-conducting.

Figure 6:
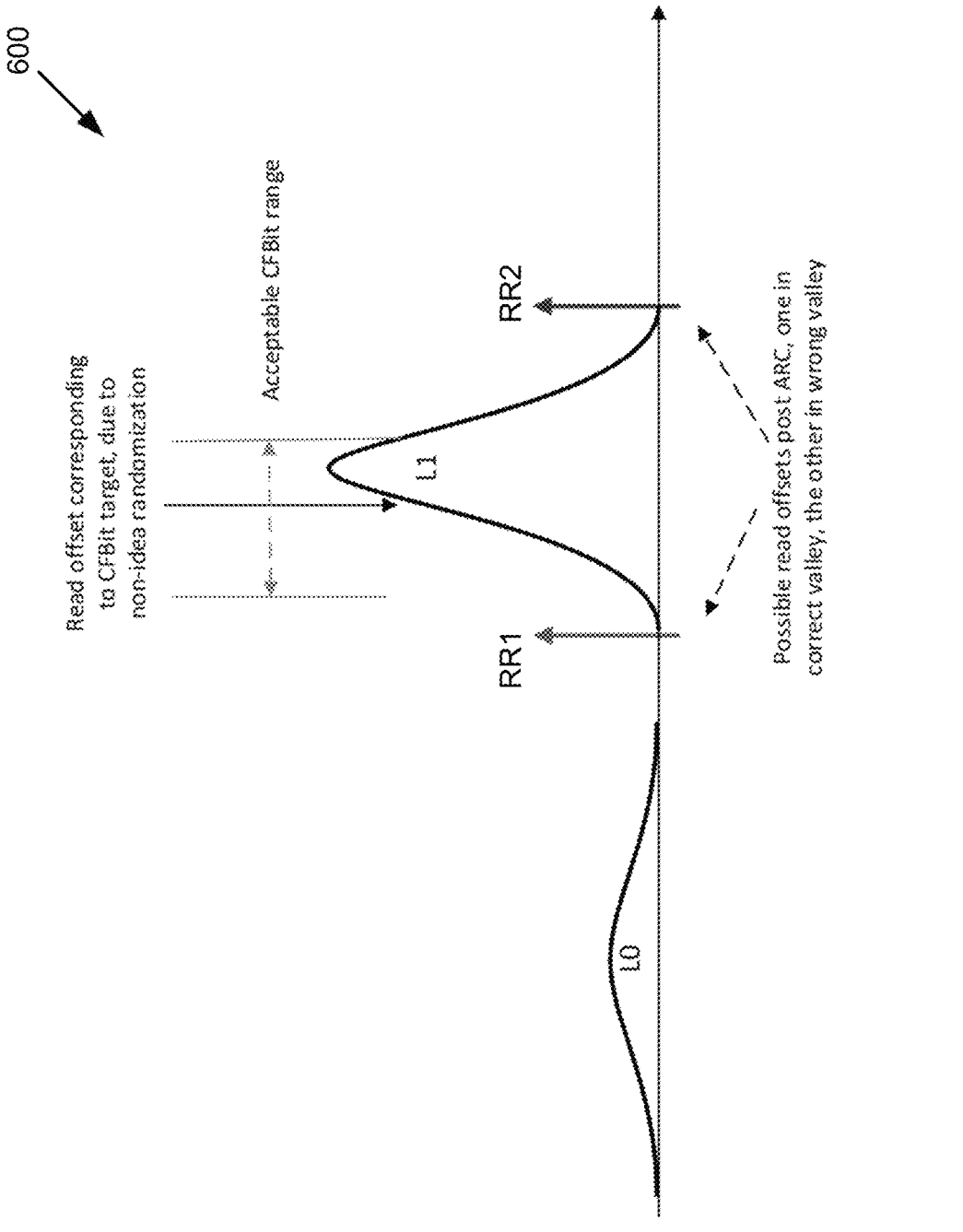
FIG. 6 is a diagram illustrating a series of programming voltage distributions for a memory device and associated check-fail bit count values in accordance with some embodiments of the present disclosure.

At operation 520, the processing logic determines whether the check-fail bit count is within a target check-fail bit count range. In one embodiment, the target check-fail bit count range is based on the ideal voltage level described above where data stored on the memory device is perfectly randomized. To account for normal variation from the ideal scenario, a buffer of voltage levels above and below the ideal voltage is included in the target check-fail bit count range. FIG. 6 illustrates an example plot 600 of two programming levels L0 and L1. The target check-fail bit count can be set at a level where an equal number of memory cells are above and below the target. If a case where programming levels L0 and L1 are balanced, this target would fall in the valley between the respective programming distributions. In plot 600, however, the distributions are not balanced. L1 has more memory cells than L0. Thus, the voltage level where an equal number of memory cells are above and below the target is shifted to a higher voltage that partially overlaps the L1 distribution. Accordingly, the target check-fail bit count range surrounding the target actually extends across the peak of the L1 distribution and into the valley on the opposite side. Regardless of the where the target check-fail bit count range falls relative to the programming distributions, error handling component 113 can compare the received check-fail bit count to the target check-fail bit count range to determine if the check-fail bit count is within the target range. If the check-fail bit count is not within the target check-fail bit count range, at operation 525, the processing logic discards the read retry offset voltage.

If the check-fail bit count is within the target check-fail bit count range, at operation 530, the processing logic performs one or more auto-read calibration operations and determines an LDPC syndrome weight for a sense word read during the read retry operation. During the one or more auto-read calibration operations, error handling component 113 sweeps the threshold voltage level across a range around a baseline threshold voltage or threshold voltage set. Sweeping the threshold voltage level across the range includes selecting a subset of threshold voltages in the range and reading the physical address of memory device 130 using the subset of threshold voltages. A set of threshold voltage levels will be identified after the sweeping and then used to read the physical addresses to get the data. The auto-read calibration operation serves to identify a read voltage level that corresponds to the bottom of the valley between programming distributions, thereby decreasing the number of errors observed during a read operation. An example is illustrated in FIG. 6. When attempting to read memory cells in L1, for example, the different read retry offset voltages can be used. In order to correctly read memory cells in L1, the read voltage should be placed in the valley between the L0 and L1 distributions (i.e., where RR1 is placed) and auto-read calibration will decrease the read voltage to the valley bottom. If a read retry offset voltage (e.g., RR2) is placed within in the target check-fail bit count range, but in the wrong valley, however, auto-read calibration will increase that read voltage to the wrong valley bottom (i.e., the valley on the other side of the L1 distribution). As the processing logic has no way of knowing which read retry offset voltage is in the correct valley, the LDPC syndrome weight can be used to identify the correct one.

In one embodiment, error handling component 113 executes a number of parity check equations on corresponding subsets of the sense word read using the read retry offset voltage at operation 515. In one embodiment, each of the parity check equations corresponds to a different subset of the bits of the sense word, although different subsets can share one or more bits. For example, in one embodiment, a subset can include 40 bits out of the 36 k bits in the sense word. There could be, for example, several thousand (e.g., 3 k) parity check equations each configured to operate on a different subset of 40 bits. Each parity check equation generates a parity check equation result which indicates whether a number of bits set to a value of '1' in the corresponding subset of the sense word is even or odd. In one embodiment, if the number of bits set to a value of '1' in the corresponding subset is even, the parity check equation result is said to be in a satisfied state and if the number of bits set to a value of '1' in the corresponding subset is odd, the parity check equation result is said to be in an unsatisfied state. In another embodiment, these values (i.e., logic states) can be reversed. Since any one bit of the sense word can be part of multiple different subsets, that bit can contribute to or be associated with multiple parity check equation results. In one embodiment, each bit of the sense word is part of the same number of subsets used by the parity check equations (e.g., 4 subsets). In addition, error handling component 113 can determine a syndrome for the sense word using the determined parity check equation results. In one embodiment, error handling component 113 logically combines the parity check equation results to determine the syndrome, such as by appending or concatenating the parity check equation results. Error handling component 113 further determines and stores a syndrome weight for the sense word The syndrome weight is a number of the parity check equations that are unsatisfied, which can be represented in the syndrome by the number of non-zero symbols (e.g., the number of bits set to a logical value of '1'). Although not a direct representation, the syndrome weight is indicative of the number of errors in the sense word read using a given read retry offset voltage. Thus, the relative syndrome weights associated with different read retry offset voltages can indicate which voltage is likely to result in fewer errors.

At operation 535, the processing logic determines whether there are additional read retry offset voltages to try. As indicated above, the memory sub-system controller 115 can implement a sequence of read retry operations at different read retry offset voltage levels. The processing logic can iterate through this sequence, performing operations 515-530 for each read retry offset voltage level in the sequence. Depending on the implementation, the sequence of read retry operations can be either preset or dynamically generated.

If there are no additional read retry offset voltages to try, at operation 540, the processing logic identifies a read retry offset voltage having the lowest LDPC syndrome weight. In one embodiment, error handling component 113 component compares the syndrome weights determined at operation 530 and identifies the lowest syndrome weight. Error handling component 113 can select the read retry voltage offset associated with the lowest syndrome weight as the preferred read level.

At operation 545, the processing logic optionally performs additional auto-read calibration operations for the subset of the read retry offset voltages and proceeds with the error recovery process. As described above, the auto-read calibration operations can include sweeping the threshold voltage level across a range around a baseline threshold voltage or threshold voltage set and the syndrome weight is the number of unsatisfied parity check equations for the read sense word. Since the auto-read calibration operation can modify the read retry offset voltage, the sense word, and associated syndrome, may be different than was read and determined in operations 515 and 530. In one embodiment, error handling component 113 can continue with error recovery (e.g., by performing deep error recovery operations). If the auto-read calibration operations performed at operation 530 are successful in reaching the valley bottom, then operation 545 may be omitted in some embodiments.

Figure 7:
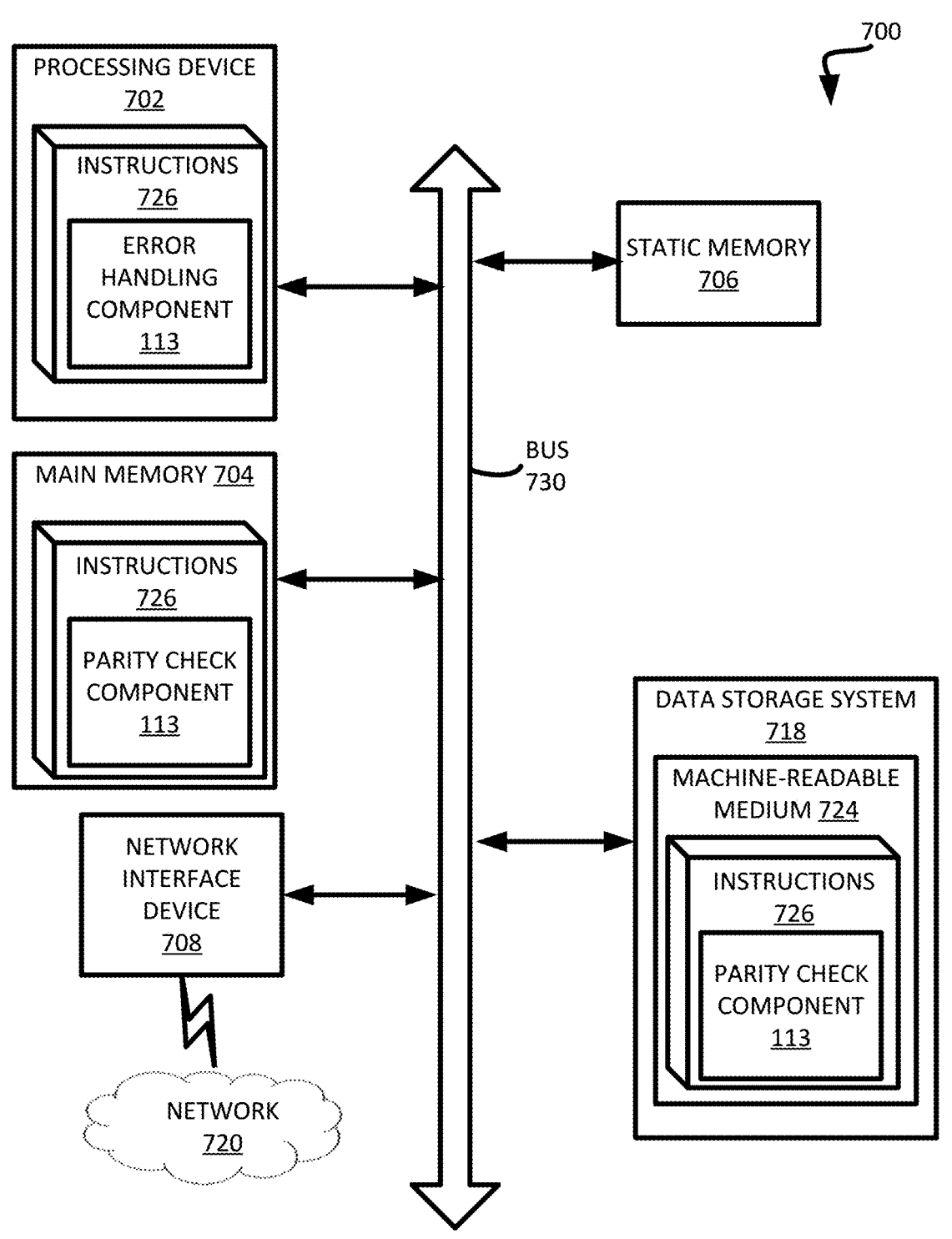
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the error handling component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system

700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 726 include instructions to implement functionality corresponding to the error handling component 113 of FIG. 1A). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

identifying a plurality of read retry offset voltages having respective check-fail bit counts that are within a target check-fail bit count range for a programming level of the memory device;

performing one or more auto-read calibration operations for each of the plurality of read retry offset voltages and determining respective syndrome weights for sense words read from the memory device using each of the plurality of read retry offset voltages;

identifying a read retry offset voltage of the plurality of read retry offset voltages having a lowest respective syndrome weight; and performing an error recovery operation using the identified read retry offset voltage.

2. The system of claim 1, wherein the processing device is to perform operations further comprising:

performing a read operation to read data from the memory device using a default read voltage;

detecting an error in the data read from the memory device; and initiating an error recovery flow using the plurality of read retry offset voltage.

3. The system of claim 1, wherein identifying the plurality of read retry offset voltages comprises:

performing read operations on the memory device using the plurality of read retry offset voltages;

receiving, from the memory device, respective check-fail bit counts corresponding to the plurality of read retry offset voltages; and comparing the respective check-fail bit counts to the target check-fail bit count range for the programming level of the memory device.

4. The system of claim 1, wherein the target check-fail bit count range is based on a threshold value representing a number of memory cells associated with the programming level relative to a number of different programming levels in the memory device.

5. The system of claim 1, wherein the processing device is to perform operations further comprising:

reading the sense words from the memory device using the plurality of read retry offset voltages;

executing a plurality of parity check equations on corresponding subsets of the sense words to determine respective pluralities of parity check equation results; and determining respective syndromes for the sense words using the plurality respective pluralities of parity check equation results, wherein the respective syndrome weights represent a number of bits in the respective syndromes set to a particular state.

6. The system of claim 5, wherein each parity check equation corresponds to a different subset of the sense words, and wherein each of the plurality of parity check equation results indicates whether a number of bits set to a value of '1' in a corresponding subset of the sense words is even or odd.

7. The system of claim 1, wherein performing the error recovery operation using the identified read retry offset voltage comprises performing at least one of an additional auto-read calibration operation or a deep retry operation.

8. A method comprising:

identifying a plurality of read retry offset voltages having respective check-fail bit counts that are within a target check-fail bit count range for a programming level of a memory device;

performing one or more auto-read calibration operations for each of the plurality of read retry offset voltages and determining respective syndrome weights for sense words read from the memory device using each of the plurality of read retry offset voltages;

identifying a read retry offset voltage of the plurality of read retry offset voltages having a lowest respective syndrome weight; and performing an error recovery operation using the identified read retry offset voltage.

9. The method of claim 8, further comprising:

performing a read operation to read data from the memory device using a default read voltage;

detecting an error in the data read from the memory device; and initiating an error recovery flow using the plurality of read retry offset voltage.

10. The method of claim 8, wherein identifying the plurality of read retry offset voltages comprises:

performing read operations on the memory device using the plurality of read retry offset voltages;

receiving, from the memory device, respective check-fail bit counts corresponding to the plurality of read retry offset voltages; and comparing the respective check-fail bit counts to the target check-fail bit count range for the programming level of the memory device.

11. The method of claim 8, wherein the target check-fail bit count range is based on a threshold value representing a number of memory cells associated with the programming level relative to a number of different programming levels in the memory device.

12. The method of claim 8, further comprising:

reading the sense words from the memory device using the plurality of read retry offset voltages;

executing a plurality of parity check equations on corresponding subsets of the sense words to determine respective pluralities of parity check equation results; and determining respective syndromes for the sense words using the plurality respective pluralities of parity check equation results, wherein the respective syndrome weights represent a number of bits in the respective syndromes set to a particular state.

13. The method of claim 12, wherein each parity check equation corresponds to a different subset of the sense words, and wherein each of the plurality of parity check equation results indicates whether a number of bits set to a value of '1' in a corresponding subset of the sense words is even or odd.

14. The method of claim 8, wherein performing the error recovery operation using the identified read retry offset voltage comprises performing at least one of an additional auto-read calibration operation or a deep retry operation.

15. A non-transitory computer-readable storage medium comprising instructions that, when executed by a processing device, cause the processing device to perform operations comprising:

identifying a plurality of read retry offset voltages having respective check-fail bit counts that are within a target check-fail bit count range for a programming level of a memory device;

performing one or more auto-read calibration operations for each of the plurality of read retry offset voltages and determining respective syndrome weights for sense words read from the memory device using each of the plurality of read retry offset voltages;

identifying a read retry offset voltage of the plurality of read retry offset voltages having a lowest respective syndrome weight; and performing an error recovery operation using the identified read retry offset voltage.

16. The non-transitory computer-readable storage medium of claim 15, wherein the instructions cause the processing device to perform operations further comprising:

performing a read operation to read data from the memory device using a default read voltage;

detecting an error in the data read from the memory device; and initiating an error recovery flow using the plurality of read retry offset voltage.

17. The non-transitory computer-readable storage medium of claim 15, wherein identifying the plurality of read retry offset voltages comprises:

performing read operations on the memory device using the plurality of read retry offset voltages;

receiving, from the memory device, respective check-fail bit counts corresponding to the plurality of read retry offset voltages; and comparing the respective check-fail bit counts to the target check-fail bit count range for the programming level of the memory device.

18. The non-transitory computer-readable storage medium of claim 15, wherein the target check-fail bit count range is based on a threshold value representing a number of memory cells associated with the programming level relative to a number of different programming levels in the memory device.

19. The non-transitory computer-readable storage medium of claim 15, wherein the instructions cause the processing device to perform operations further comprising:

reading the sense words from the memory device using the plurality of read retry offset voltages;

executing a plurality of parity check equations on corresponding subsets of the sense words to determine respective pluralities of parity check equation results; and determining respective syndromes for the sense words using the plurality respective pluralities of parity check equation results, wherein the respective syndrome weights represent a number of bits in the respective syndromes set to a particular state.

20. The non-transitory computer-readable storage medium of claim 19, wherein each parity check equation corresponds to a different subset of the sense words, and wherein each of the plurality of parity check equation results indicates whether a number of bits set to a value of '1' in a corresponding subset of the sense words is even or odd.

* * * * *